(12) United States Patent
Tanaka et al.

(10) Patent No.: US 9,108,625 B2
(45) Date of Patent: Aug. 18, 2015

(54) POWER TRANSMITTING APPARATUS FOR VEHICLE

(71) Applicant: DENSO CORPORATION, Kariya, Aichi-pref. (JP)

(72) Inventors: Eitaro Tanaka, Nagoya (JP); Takahiro Narita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 87 days.

(21) Appl. No.: 13/855,319

(22) Filed: Apr. 2, 2013

(65) Prior Publication Data

US 2013/0267380 A1  Oct. 10, 2013

(30) Foreign Application Priority Data

Apr. 5, 2012 (JP) .................. 2012-86355

(51) Int. Cl.
| | |
|---|---|
| B60K 6/48 | (2007.10) |
| B60W 10/11 | (2012.01) |
| B60W 10/02 | (2006.01) |
| B60W 10/04 | (2006.01) |
| B60W 10/184 | (2012.01) |
| B60K 6/30 | (2007.10) |
| B60K 6/365 | (2007.10) |
| B60K 6/485 | (2007.10) |

(52) U.S. Cl.
CPC .................. B60W 10/11 (2013.01); B60K 6/30 (2013.01); B60K 6/365 (2013.01); B60K 6/485 (2013.01); B60W 10/02 (2013.01); B60W 10/04 (2013.01); B60W 10/184 (2013.01); B60K 2006/4808 (2013.01); Y02T 10/626 (2013.01); Y02T 10/6226 (2013.01); Y10T 477/6392 (2015.01); Y10T 477/641 (2015.01)

(58) Field of Classification Search
USPC .......... 475/267; 477/92, 184; 322/4; 180/165
See application file for complete search history.

(56) References Cited

U.S. PATENT DOCUMENTS

| | | | | |
|---|---|---|---|---|
| 3,077,796 | A | * | 2/1963 | Johnson et al. .................. 475/13 |
| 5,993,351 | A | * | 11/1999 | Deguchi et al. ................... 477/5 |
| 7,341,534 | B2 | | 3/2008 | Schmidt |

(Continued)

FOREIGN PATENT DOCUMENTS

| | | | |
|---|---|---|---|
| EP | 2532548 A2 | * | 12/2012 |
| GB | 2448598 | | 10/2008 |

(Continued)

OTHER PUBLICATIONS

Office Action (2 pages) dated Mar. 11, 2014, issued in corresponding Japanese Application No. 2012-086355 and English translation (2 pages).

Primary Examiner — Ramya Burgess
Assistant Examiner — Lillian Nguyen
(74) Attorney, Agent, or Firm — Nixon & Vanderhye P.C.

(57) ABSTRACT

A planetary gear device is provided between a driving wheel and an energy accumulating device. A sun gear of the planetary gear device is connected to an input shaft of the energy accumulating device. A carrier of the planetary gear device is connected to the driving wheel. A torque adjusting device is connected to a ring gear of the planetary gear device. When a regeneration control is not carried out, the torque adjusting device is controlled by a control unit, so that a braking torque generated at the torque adjusting device and applied to the ring gear is controlled in order to make a difference of a rotational speed at a smaller value between the input shaft and the sun gear.

13 Claims, 7 Drawing Sheets

(56) References Cited

U.S. PATENT DOCUMENTS

| | | |
|---|---|---|
| 2009/0101465 A1* | 4/2009 | Hart et al. .................. 192/41 R |
| 2010/0051361 A1* | 3/2010 | Katsuta et al. ............ 180/65.23 |
| 2010/0059938 A1 | 3/2010 | Hilton et al. |
| 2010/0126302 A1 | 5/2010 | Hilton et al. |
| 2010/0151980 A1 | 6/2010 | Bowman et al. |
| 2010/0152982 A1 | 6/2010 | Bowman et al. |
| 2010/0152984 A1 | 6/2010 | Bowman et al. |
| 2010/0184549 A1 | 7/2010 | Sartre et al. |
| 2010/0185352 A1 | 7/2010 | Bowman et al. |
| 2010/0192708 A1 | 8/2010 | Kees et al. |
| 2011/0023636 A1 | 2/2011 | Atkins et al. |
| 2011/0106359 A1 | 5/2011 | Tanaka et al. |
| 2011/0118075 A1* | 5/2011 | Kawasaki et al. ............. 475/331 |
| 2011/0214528 A1 | 9/2011 | Foley et al. |
| 2011/0232415 A1 | 9/2011 | Early et al. |

FOREIGN PATENT DOCUMENTS

| | | |
|---|---|---|
| GB | 2449117 | 11/2008 |
| GB | 2459110 | 10/2009 |
| GB | 2463136 | 3/2010 |
| GB | 2463502 | 3/2010 |
| JP | 2004-042760 | 2/2004 |
| JP | 2009-143485 | 7/2009 |
| WO | WO 2009/010819 | 1/2009 |

* cited by examiner

POWER TRANSMITTING APPARATUS FOR VEHICLE

CROSS REFERENCE TO RELATED APPLICATION

This application is based on Japanese Patent Application No. 2012-086355 filed on Apr. 5, 2012, the disclosure of which is incorporated herein by reference.

FIELD OF TECHNOLOGY

The present disclosure relates to a power transmitting apparatus having a planetary gear device, which is installed in a vehicle.

BACKGROUND

A power transmitting apparatus is known in the art, for example, as disclosed in International Patent Publication No. WO2009/010819 (corresponding to Patent Application Publication No. US2010/0184549 A1). The power transmitting apparatus has a planetary gear device for transmitting rotational force among a driving shaft for connecting an internal combustion engine to driving wheels, a flywheel for accumulating rotational energy, and an electric power generator. More in detail, the planetary gear device provided in the power transmitting apparatus has a sun gear, a carrier and a ring gear, which are respectively connected to the flywheel, the driving shaft and the electric power generator. According to the power transmitting apparatus, kinetic energy of a vehicle can be transmitted to the flywheel via the driving shaft and the planetary gear device and a regeneration control for accumulating the kinetic energy in the flywheel can be carried out.

According to the power transmitting apparatus of the above Patent Publication, the rotational energy accumulated in the flywheel may be discharged via the sun gear of the planetary gear device depending on an operational mode of the electric power generator, even when the rotational energy was once accumulated in the flywheel.

Not only in the power transmitting apparatus having the flywheel for accumulating the rotational energy but also in a power transmitting apparatus having any other energy accumulating device, this kind of unfavorable situation, which is caused by torque transmission from the energy accumulating device to a rotating device connected to the planetary gear device, may occur.

SUMMARY OF THE DISCLOSURE

The present disclosure is made in view of the above point. It is an object of the present disclosure to provide a power transmitting apparatus for a vehicle, according to which it is possible to avoid an unfavorable situation taking place when torque is transmitted from an energy accumulating device to a rotating member of a planetary gear device.

According to a feature of the present disclosure, a power transmitting apparatus for a vehicle has a planetary gear device. The planetary gear device comprises;

a first rotating member operatively connected to an energy accumulating device via an input shaft;

a second rotating member connected to a driving wheel of the vehicle; and a third rotating member connected to a torque adjusting device.

The torque adjusting device generates a braking torque to be applied to the torque adjusting device itself.

The first rotating member, the second rotating member and the third rotating member are rotatably coupled to one another so that a rotational force is operatively transmitted to the energy accumulating device via the planetary gear device.

The power transmitting apparatus further has a block-off device for blocking off (shutting off) a power transmission from the input shaft to the first rotating member.

According to the above feature, it is possible to block off the power transmission from the input shaft to the first rotating member when such power transmission is not required. As a result, it is possible to avoid an unfavorable situation, which may take place due to the power transmission from the input shaft to the first rotating member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

A power transmitting apparatus according to the present disclosure will be explained hereinafter by way of multiple embodiments. The same reference numerals are given to the same or similar portions and/or structures throughout the embodiments, for the purpose of eliminating repeated explanation.

First Embodiment

A first embodiment of the present disclosure, according to which the power transmitting apparatus is applied to a vehicle having an internal combustion engine, will be explained with reference to the drawings.

Figure 1:
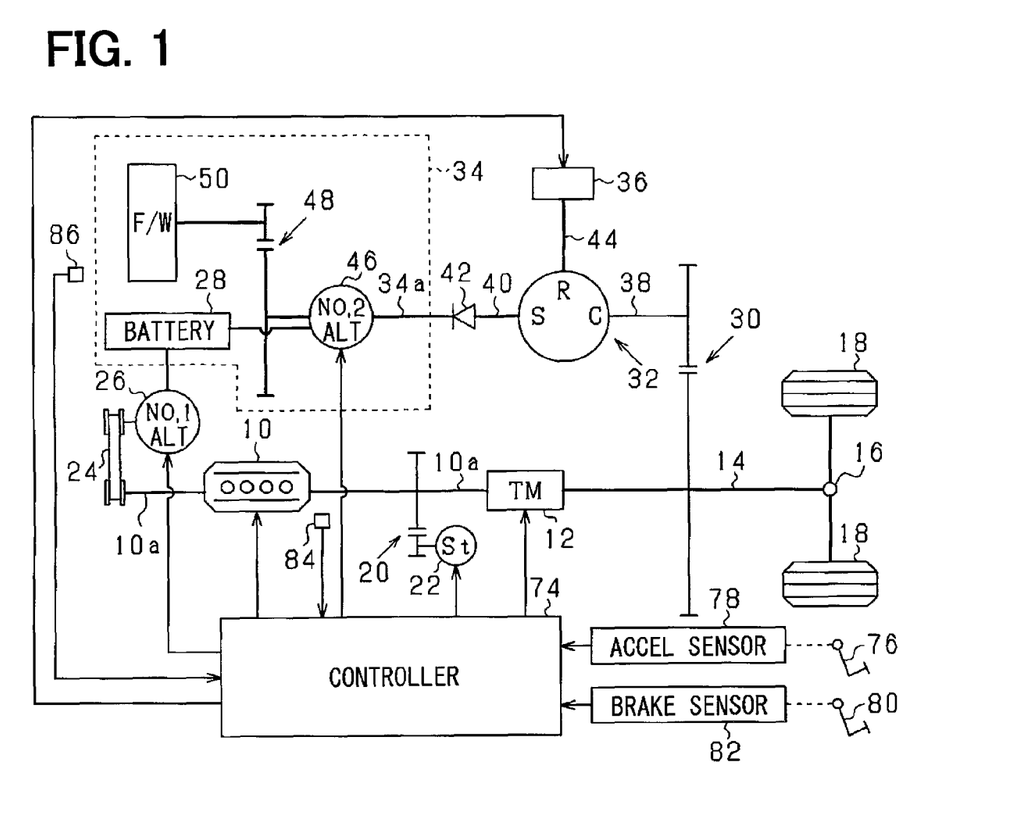
FIG. 1 is a diagram showing a system structure of a power transmitting apparatus according to a first embodiment of the present disclosure.

A system structure of the power transmitting apparatus of the first embodiment is shown in FIG. 1.

In FIG. 1, the internal combustion engine 10 (hereinafter, the engine 10) is installed in the vehicle. An output shaft 10a of the engine 10 (that is, a crank shaft 10a) is connected to driving wheels 18 via a transmission device 12, a driving shaft 14 and a differential gear 16. A starter 22 is connected to the crank shaft 10a via a speed reduction mechanism 20 in order to give an initial rotation to the crank shaft 10a. The speed reduction mechanism 20 is a device for rotating the crank shaft 10a at a rotational speed lower than that of the starter 22.

A first alternator 26 is connected to the crank shaft 10a via a belt 24. The first alternator 26 is composed of a regulator (not shown), a rotor coil (not shown) and so on and generates electric power when it is rotated. The first alternator 26 has a function as an electric power source for in-vehicle accessory devices, such as the starter 22 and a function for charging a battery 28 (for example, a lead battery). The electric power generated by the first alternator 26 is controlled by adjusting exciting current supplied to the rotor coil. The electric power generated by the first alternator 26 is increased when load torque becomes larger by adjusting the exciting current or when rotational speed thereof is increased.

A planetary gear device 32 is connected to the driving shaft 14 via a speed-increase gear mechanism 30. The planetary gear device 32 is composed of a carrier C, a sun gear S and a ring gear R, each of which is a rotatable member engaged with one another, so that rotating force is transmitted from the driving wheels 18 (that is, the driving shaft 14) to input shaft 34a of an energy accumulating device 34 and a torque adjusting device 36. More in detail, the carrier C is connected to the driving shaft 14 via a carrier shaft 38 and the speed-increase gear mechanism 30, the sun gear S is connected to the input shaft 34a via a sun-gear shaft 40 and a one-way clutch 42, and the ring gear R is connected to the torque adjusting device 36 via a ring-gear shaft 44. The speed-increase gear mechanism 30 is a device for rotating the carrier shaft 38 at a rotational speed higher than that of the driving shaft 14.

The energy accumulating device 34 has a second alternator 46, a speed-increase gear mechanism 48 and a flywheel 50. In a similar manner to the first alternator 26, the second alternator 46 has the function as the electric power source for the in-vehicle accessory devices and the function for charging the battery 28. The electric power generated by the second alternator 46 is likewise increased when load torque becomes larger by adjusting exciting current or when rotational speed thereof is increased. The second alternator 46, which converts rotational energy inputted from the input shaft 34a to electric energy, and the battery 28, which accumulates at least a part of the electric energy generated at the second alternator 46, form an electric energy accumulating unit. The speed-increase gear mechanism 48 is a device for rotating the flywheel 50 at a rotational speed higher than that of the input shaft 34a.

The flywheel 50 corresponds to a rotational energy accumulating unit for accumulating the inputted rotational energy as it is.

Figure 2:
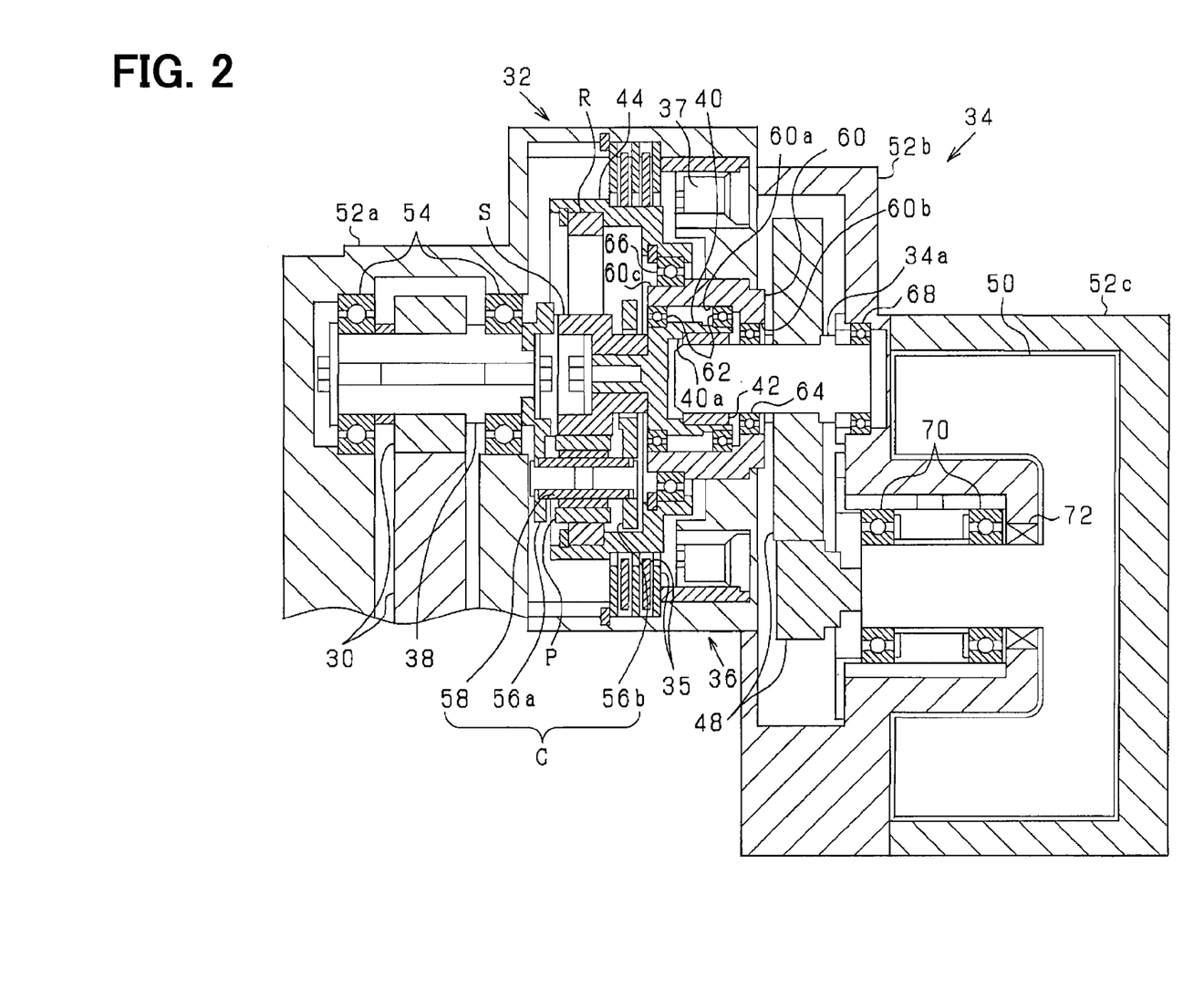
FIG. 2 is a schematic cross sectional view showing a planetary gear device and an energy accumulating device.

A structure of the planetary gear device 32, the energy accumulating device 34 and so on will be explained with reference to FIG. 2. FIG. 2 is a cross sectional view showing the planetary gear device 32 and so on.

As shown in FIG. 2, the planetary gear device 32, the torque adjusting device 36 and the energy accumulating device 34 are integrally formed and accommodated in housing members 52a, 52b and 52c. In the present embodiment, the housing members 52a, 52b and 52c are made of aluminum and manufactured by a die-cast process.

The carrier shaft 38 connected to the speed-increase gear mechanism 30, which is made of iron material, is rotatably supported by a pair of bearings 54 fixed to the housing member 52a. The carrier shaft 38 is formed in a column shape or a cylindrical hollow shape. Each of the bearings 54 is composed of a ball bearing having an inner race, an outer race and rolling elements (balls or rollers).

The planetary gear device 32 is composed of the sun gear S, the ring gear R which is an internal gear surrounding the sun gear S, multiple pinions P arranged at an outer periphery of the sun gear S and engaged with the sun gear S and the ring gear R, and the carrier C for rotatably supporting the multiple pinions P. Center axes of the sun gear S, the ring gear R and the carrier C are so arranged as to coincide with one another.

The carrier C has a pair of annular plates 56a and 56b, each of which is formed in a disc shape extending in a radial direction perpendicular to the center axis line of the carrier C. The pair of annular plates 56a and 56b rotatably supports the multiple pinions P. The carrier C has multiple pinion shafts 58 for connecting the annular plates 56a and 56b with each other. The carrier shaft 38 is coaxially connected to the annular plate 56a. In other words, the center axis line of the carrier shaft 38 and the center axis line of the carrier C coincide with each other. The carrier shaft 38 is rotated together with the carrier C.

The sun gear S is connected to the sun-gear shaft 40. The sun-gear shaft 40, which is made of iron material and formed in a cylindrical hollow shape, is coaxially arranged with the sun gear S. In other words, the center axis line of the sun gear S and the center axis line of the sun-gear shaft 40 coincide with each other. A first axial end (a left-hand end in FIG. 2) of the sun-gear shaft 40 is connected to the sun gear S. A second axial end (a right-hand end in FIG. 2) of the sun-gear shaft 40, which is opposite to the first axial end, is formed with a cylindrical bore 40a into which one end of the input shaft 34a is inserted.

The multiple pinions P are arranged at equal intervals in a circumferential direction of the annular plates 56a and 56b. More exactly, the pinions P are arranged at equal intervals on a circumference having a certain radius on a plane perpendicular to the center axis line of the pair of annular plates 56a and 56b (that is, the center axis line of the carrier C). In the present embodiment, three pinions P are arranged at intervals of 120 degrees on the above circumference (although only one pinion P is shown in FIG. 2).

The ring gear R is connected to the ring-gear shaft 44. The ring-gear shaft 44, which is made of iron material and formed in a cylindrical hollow shape, is coaxially arranged with the ring gear R. In other words, the center axis line of the ring gear R and the center axis line of the ring-gear shaft 44 coincide with each other. Accordingly, the ring gear R and the ring-gear shaft 44 are rotated together with each other.

A supporting member 60 is made of iron material and formed in a cylindrical hollow shape, wherein a through hole is coaxially formed with the center axis line thereof. The supporting member 60 is fixed to the housing member 52a. More exactly, one end of the supporting member 60 (a right-hand end in FIG. 2) is fitted into a bore formed in the housing 52a by thermal insert.

Figure 3:
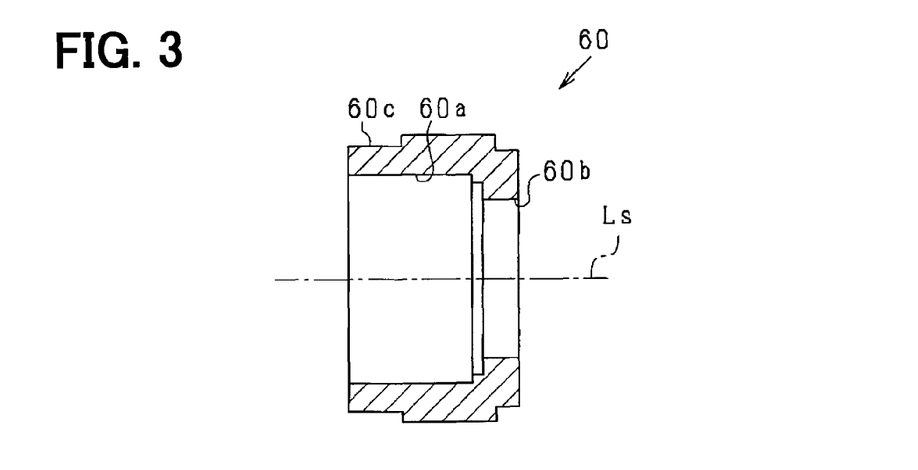
FIG. 3 is a schematic cross sectional view showing a supporting member.

As shown in FIG. 3, a large-diameter inner peripheral portion 60a and a small-diameter inner peripheral portion 60b are formed in the supporting member 60 coaxially with a center axis line Ls thereof. A pair of first inside bearings 62 is press-inserted into the large-diameter inner peripheral portion 60a, while a second inside bearing 64 is press-inserted into the small-diameter inner peripheral portion 60b. An outer peripheral portion 60c is also coaxially formed in the supporting member 60, so that an outside bearing 66 is press-fitted onto the outer peripheral portion 60c. An inner diameter of the small-diameter inner peripheral portion 60b is smaller than that of the large-diameter inner peripheral portion 60a.

Back to FIG. 2, each of the first inside bearings 62, the second inside bearing 64 and the outside bearing 64 is composed of a ball bearing having an inner race, an outer race and rolling elements (balls or rollers). The outer race of each first inside bearing 62 is press-inserted into the large-diameter inner peripheral portion 60a, while the outer race of the second inside bearing 64 is press-inserted into the small-diameter inner peripheral portion 60b. The inner race of the outside bearing 66 is press-fitted onto the outer peripheral portion 60c. A bearing 68 is fixed to the housing member 52b.

An outer race of the one-way clutch 42 is fixed to the cylindrical bore 40a of the sun-gear shaft 40, while an inner race of the one-way clutch 42 is fixed to the input shaft 34a. The one-way clutch 42 transmits torque from the sun-gear shaft 40 to the input shaft 34a, unless a relative rotational speed of the sun-gear shaft 40 with respect to that of the input shaft 34a is negative, in other words, unless the rotational speed of the sun-gear shaft 40 is lower than that of the input shaft 34a. The one-way clutch 42 does not transmit the torque from the sun-gear shaft 40 to the input shaft 34a when the relative rotational speed of the sun-gear shaft 40 with respect to that of the input shaft 34a is negative (that is, when the rotational speed of the sun-gear shaft 40 is lower than that of the input shaft 34a). It is, therefore, possible to avoid a situation by a function of the one-way clutch 42 that the rotational energy once accumulated in the flywheel 50 is transmitted to the sun-gear shaft 40. As a result, it is possible to avoid such a situation that the rotational energy accumulated in the flywheel 50 is consumed for any other purposes than that of generating the electric power at the second alternator 46. In the above explanation, the relative rotational speed corresponds to a value (Ns−Nin), which is obtained by subtracting the rotational speed (Nin) of the input shaft 34a from the rotational speed (Ns) of the sun-gear shaft 40 (that is, the rotational speed of the sun gear S).

In the above explained structure, the sun-gear shaft 40 is rotatably supported by the first inside bearing 62, the ring-gear shaft 44 is rotatably supported by the outside bearing 66, and the input shaft 34a is rotatably supported by the second inside bearing 64 and the bearing 68.

The torque adjusting device 36 adjusts a torque applied to the torque adjusting device itself. In the present embodiment, the torque adjusting device 36 has a wet-type electromagnetic braking unit, which is composed of a wet-type clutch mechanism 35 (having a pair of friction plates) and an electromagnetic coil 37. The torque adjusting device 36 applies a braking torque to the ring gear R by friction between the pair of friction plates, when electric power is supplied to the electromagnetic coil 37. When the braking torque is applied to the ring gear R, the rotation of the ring gear R is suppressed.

In the present embodiment, the wet-type clutch mechanism 35 is used for the torque adjusting device 36 in order to avoid a situation that a structure inside of the housing member 52a becomes complicated. Although not shown in the drawing, lubricating oil is supplied to the planetary gear device 32 accommodated in the housing 52a so as to assure reliability of its operation. In a case that a dry-type clutch mechanism is used, it is necessary to prevent the lubricating oil from moving from the planetary gear device to the dry-type clutch mechanism. Therefore, the structure of the housing member 52a may become complicated.

The input shaft 34a is connected to the flywheel 50 via the speed-increase gear mechanism 48. In the present embodiment, although not shown in FIG. 2, the second alternator 46 is connected to the input shaft 34a via a gear fixed to the input shaft 34a.

A pair of bearings 70 is fixed to the housing member 52c. A shaft of the flywheel 50 is rotatably supported by the bearings 70. Each of the bearings 70 is composed of a ball bearing having an inner race, an outer race and rolling elements (balls or rollers). A seal member 72 is provided between the shaft of the flywheel 50 and the flywheel 50 in order to seal a gap between an inside and an outside of the housing member 52b.

In the present embodiment, the sun-gear shaft 40, the ring-gear shaft 44 and the input shaft 34a are supported by the single supporting member 60 via the bearings. Accuracy for coaxial arrangement of those shafts is increased. In other words, displacements of the center axes for the sun-gear shaft 40, the ring-gear shaft 44 and the input shaft 34a from one another can be made as smaller as possible.

In the present embodiment, the housing members 52a, 52b and 52c are made of aluminum in order to make the weight thereof smaller. The supporting member 60 is made of iron material in order to avoid such a situation that the bearings may be displaced when thermal expansion coefficient of the bearing is smaller than that of the housing members.

As above, the supporting member 60 and the housing members 52a, 52b and 52c are formed as separate parts from each other, because the materials thereof are different from each other. Since the supporting member 60 is made as the separate part and the supporting member 60 is a small part when compared with the housing members 52a, 52b and 52c, processes for an inner peripheral surface as well as an outer peripheral surface can be done by a lathe turning machine. In case of the lathe turning machine, two dimensions (a cutting amount and a feeding amount) are controlled. In case of a milling machine, it is necessary to control a tri-axial accuracy of position. Therefore, in case of the lathe turning machine (in which biaxial accuracy of position is required), higher machining accuracy can be expected than the milling machine (in which the tri-axial accuracy of position is required). When manufacturing the supporting member 60 (having the large-diameter inner peripheral portion 60a, the small-diameter inner peripheral portion 60b and the outer peripheral portion 60c), it is possible to process the remaining two peripheral portions on the basis of the center axis line of one of the peripheral portions. As a result, the displacements of the center axis lines from one another can be made as small as possible, among the large-diameter inner peripheral portion 60a, the small-diameter inner peripheral portion 60b and the outer peripheral portion 60c. In other words, displacements of the center axis lines of the sun-gear shaft 40, the ring-gear shaft 44 and the input shaft 34a can be made smaller as much as possible. It is possible to prevent the reliability of the planetary gear device 32 from being decreased, even when load on contacting surfaces between the sun gear S and the pinions P is increased.

Back to FIG. 1, a controller 74 is composed of a well-known micro-computer having a CPU, a ROM, a RAM and so on, for controlling a vehicle running operation. The following output signals are inputted to the controller 74;

an output signal of an acceleration sensor 78 for detecting an operating stroke of an acceleration pedal 76 (hereinafter, an acceleration operating amount) operated by a vehicle driver;

an output signal of a brake sensor 82 for detecting an operating stroke of a brake pedal 80 (hereinafter, the brake operating amount) operated by the vehicle driver;

an output signal of a crank angle sensor 84 for detecting a rotational speed of the crank shaft 10a; and an output signal of a rotational speed sensor 86 for detecting a rotational speed of the flywheel 50, and so on.

The controller 74 carries out various kinds of control programs memorized in the ROM based on input information for the above output signals, to thereby perform an engine start control by the starter 22, a combustion control of the engine 10, an electric power generation control by the first and the second alternators 26 and 46, and so on.

In the combustion control of the engine 10, the controller 74 calculates a required driving force of the engine 10 based on the output signal (a detected value) of the acceleration sensor 78 and so on. The controller 74 further controls amount of fuel to be injected into respective cylinders of the engine 10 based on the required driving force. When the required driving force of the engine 10 becomes larger, the amount of the fuel to be supplied to the engine 10 becomes larger.

The controller 74 further carries out a regeneration control. In the regeneration control, a kinetic energy of the vehicle is transmitted to the flywheel 50 via the planetary gear device 32 and the input shaft 34a and the kinetic energy is accumulated in the flywheel 50 as the rotational energy, when a braking operation is carried out by the vehicle driver. During the regeneration control, the second alternator 46 is rotated by the rotational energy accumulated in the flywheel 50 and the rotational energy transmitted from the input shaft 34a so as to generate the electric power, while the operation for generating the electric power by the first alternator 26 is stopped. According to the above regeneration control, it is possible to decrease frequency of driving the first alternator 26, to thereby improve fuel consumption ratio of the engine 10.

During the regeneration control, the braking torque is applied to the ring gear R by the torque adjusting device 36, so that the torque (the rotational movement) can be transmitted from the driving wheels 18 to the flywheel 50 via the planetary gear device 32. The controller 74 determines based on the output signal from the brake sensor 82 whether the braking operation is carried out.

The regeneration control is carried out not only when the vehicle is decelerated by the braking operation but also when the vehicle is running at a constant speed on a downhill road with the braking operation. A fuel-cut control (one of the engine control operations by stopping fuel injection) is carried out when the vehicle is running on the downhill road.

Since the one-way clutch 42 is provided, in the case that the relative rotational speed of the sun-gear shaft 40 with respect to the rotational speed of the input shaft 34a is negative, the rotational speed of the pinions P becomes almost zero. Then, the rotational speed of the sun gear S, the rotational speed of the carrier C and the rotational speed of the ring gear R become almost equal to one another. According to the investigation of the inventors of the present disclosure, there are some disadvantages (explained below) in the above operation in which the rotational speeds of the respective gears become equal to one another.

At first, mechanical loss is increased due to a so-called drag operation of the one-way clutch 42. More in detail, when a difference between the rotational speed of the one-way clutch 42 on a side of the input shaft 34a (that is, the rotational speed of the inner race of the one-way clutch 42) and the rotational speed of the one-way clutch on a side of the sun-gear shaft 40 (that is, the rotational speed of the outer race of the one-way clutch 42) becomes larger, the mechanical loss of the one-way clutch 42 becomes larger. In other words, a portion of the rotational energy accumulated in the flywheel 50, which is wasted in the one-way clutch 42, becomes larger.

Secondly, a time period, from a first time point of starting the regeneration control to a second time point for actually accumulating the kinetic energy of the vehicle in the flywheel 50, becomes longer. More in detail, when the regeneration control starts, the braking torque is applied to the ring gear R by the torque adjusting device 36. Then, the rotational speed of the sun-gear shaft 40 is increased. Thereafter, when the relative rotational speed of the sun-gear shaft 40 with respect to the rotational speed of the input shaft 34a is changed from negative to positive (at the second time point), the accumulation of the kinetic energy of the vehicle in the flywheel 50 is started. When the difference of the rotational speed between the inner race and the outer race of the one-way clutch 42 is larger at the first time point of starting the regeneration control, the time period from the first time point to the second time point (at which the relative rotational speed of the sun-gear shaft 40 with respect to the rotational speed of the input shaft 34a is changed to positive) becomes longer. Namely, during the time period between the first time point to the second time point, it is not possible to accumulate the kinetic energy of the vehicle in the flywheel. In other words, efficiency for collecting the kinetic energy of the vehicle is decreased.

In particular, when the vehicle starts running after a temporal stop of the vehicle, the rotational speed of the sun-gear shaft 40 is zero or decreased to a small value. Therefore, the difference of the rotational speed between the inner race and the outer race of the one-way clutch is large. Accordingly, in the condition that the vehicle starts the running after the temporal stop of the vehicle, the mechanical loss at the one-way clutch may become larger and the efficiency for collecting the kinetic energy of the vehicle may be decreased.

In the present embodiment, in order to overcome the above disadvantages, a speed-difference adjusting control is carried out when the regeneration control is not carried out. According to the speed-difference adjusting control, the difference of the rotational speed between the input shaft 34a and the sun-gear shaft 40 is controlled at a smaller value.

Figure 4:
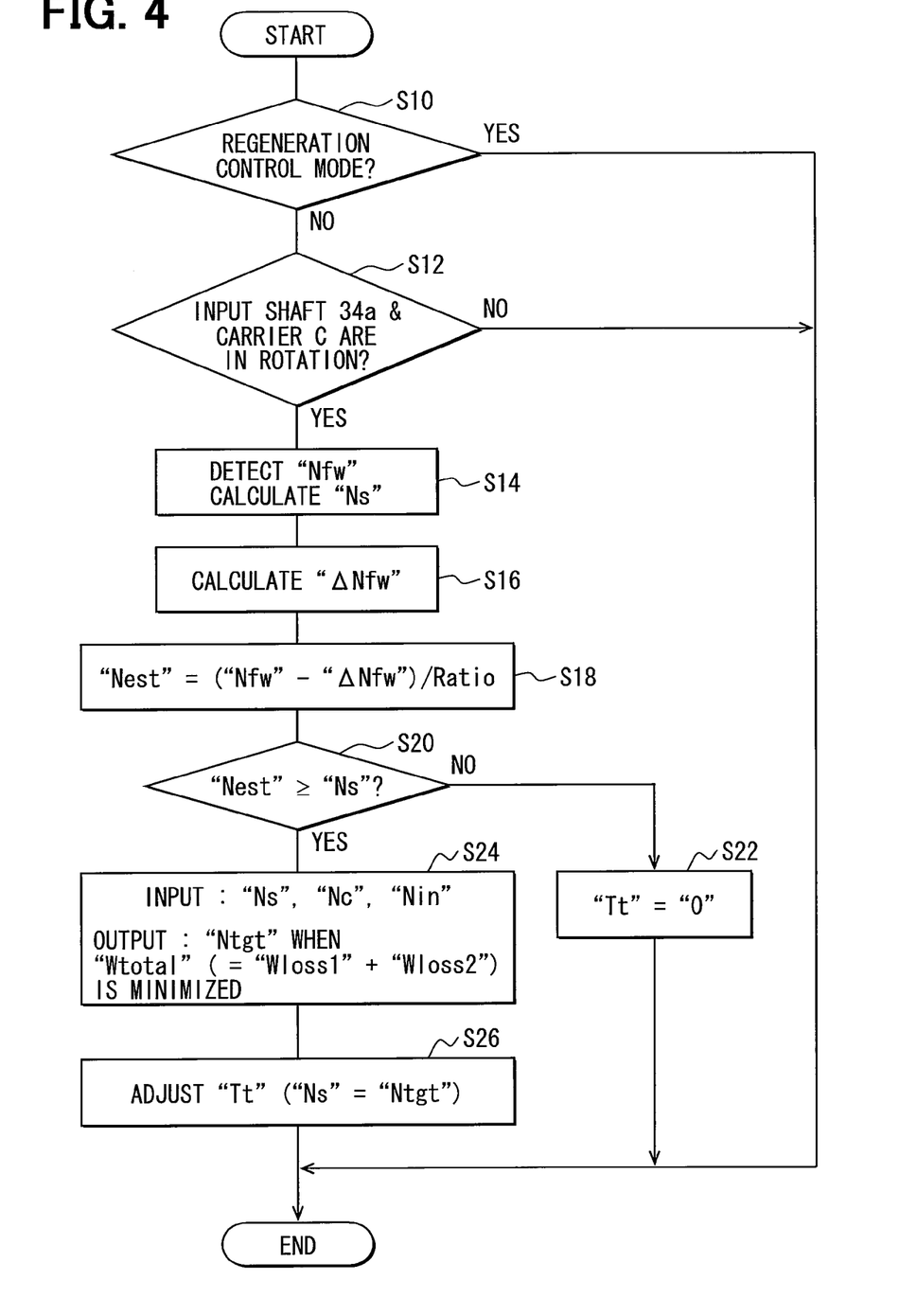
FIG. 4 is a flow-chart showing a process for adjusting a speed difference.

FIG. 4 shows a flow-chart showing a process for the speed-difference adjusting control of the present embodiment. The process of FIG. 4 is repeatedly carried out by the controller 74 at a predetermined cycle.

At a step S10, the controller 74 determines whether a vehicle running condition is a condition for carrying out the regeneration control (hereinafter, the regeneration control mode) or not. The controller 74 determines whether the vehicle running condition is in the regeneration control mode or not, for example, based on the output signal of the brake sensor 82.

When the vehicle running condition is not in the regeneration control mode (NO at the step S10), the process goes to a step S12, at which the controller 74 determines whether the input shaft 34a and the carrier C are rotated. The determination whether the input shaft 34a is rotated or not corresponds to a determination whether the rotational energy is accumulated in the flywheel 50 or not. The determination whether the carrier C is rotated or not corresponds to a determination whether the vehicle is running or not. The controller 74 determines whether the input shaft 34a is rotated or not based on the output signal from the rotational speed sensor 86. The controller 74 determines whether the carrier C is rotated or not, for example, based on the crank angle sensor 84 when the driving force is transmitted from the crank shaft 10a to the driving shaft 14 via the transmission device 12.

When the determination at the step S12 is YES, the process goes to a step S14, at which the controller 74 detects the rotational speed "Nfw" of the flywheel 50 and calculates the rotational speed "Ns" of the sun-gear shaft 40 (that is, the rotational speed of the sun gear S). For example, a sensor is provided to detect a rotational speed of the ring-gear shaft 44 (the rotational speed of the ring gear R) and a sensor is provided for detecting a vehicle speed in order to calculate the rotational speed "Ns" of the sun-gear shaft 40. The controller 74 calculates the rotational speed "Ns" of the sun-gear shaft 40 based on the rotational speed of the ring-gear shaft 44, the vehicle speed and a speed-increase ratio at the speed-increase mechanism 30.

At a step S16, the controller 74 calculates a speed decreasing amount "ΔNfw" (≥0) from the rotational speed of the flywheel 50 at a current processing cycle to the rotational speed of the flywheel 50 at a next processing cycle. More exactly, the controller 74 calculates (estimates) the above speed decreasing amount "ΔNfw" based on the electric power generated at the second alternator 46, an amount of the rotational energy of the flywheel 50, which will be lost for a unit time due to friction resistances, and so on. As the electric power generated at the second alternator 46 and the rotational energy of the flywheel 50 to be lost become larger, the speed decreasing amount "ΔNfw" becomes larger. The amount of the rotational energy, which will be lost for the unit time, becomes larger as the rotational speed "Nfw" of the flywheel 50 becomes higher.

At a step S18, the controller 74 calculates an estimated rotational speed of the flywheel 50 at the next processing cycle by subtracting the speed decreasing amount "ΔNfw" from the rotational speed "Nfw" of the flywheel 50 at the current processing cycle. Then, the controller 74 calculates an estimated value for the rotational speed of the input shaft 34a (hereinafter, the estimated rotational speed "Nest") at the next processing cycle by dividing the estimated rotational speed "Nfw−ΔNfw" of the flywheel 50 by a speed-increase ratio "Ratio" of the speed-increase gear mechanism 48.

At a step S20, the controller 74 determines whether the estimated rotational speed "Nest" of the input shaft 34a is larger than the rotational speed "Ns" of the sun-gear shaft 40. In other words, the controller 74 estimates whether the relative rotational speed of the sun-gear shaft 40 with respect to the rotational speed of the input shaft 34a becomes negative or not.

When the determination at the step S20 is NO, the controller 74 estimates that the relative rotational speed of the sun-gear shaft 40 with respect to the rotational speed of the input shaft 34a will become positive at the next processing cycle, and the process goes to a step S22. At the step S22, the controller 74 operates the torque adjusting device 36, so that the braking torque "Tt" of the torque adjusting device 36 becomes zero ("Tt"=0). According to the above operation, the torque transmission (the transmission of the rotational force) between the flywheel 50 and the sun gear S is blocked out in advance before the relative rotational speed of the sun-gear shaft 40 with respect to the input shaft 34a is actually changed from negative to positive.

When the determination at the step S20 is YES, the controller 74 estimates that the relative rotational speed of the sun-gear shaft 40 with respect to the rotational speed of the input shaft 34a will be negative at the next processing cycle, and the process goes to a step S24. At the step S24, the controller 74 sets a target value for the rotational speed "Ns" of the sun-gear shaft 40 (hereinafter, the target rotational speed "Ntgt" of the sun-gear shaft 40). The target rotational speed "Ntgt" of the sun-gear shaft 40 corresponds to such a value, at which a total mechanical loss "Wtotal" is minimized. The total mechanical loss "Wtotal" is a total value of a first mechanical loss "Wloss1" and a second mechanical loss "Wloss2". The first mechanical loss "Wloss1" corresponds to a mechanical loss generated at the planetary gear device 32, when the carrier C, the sun gear G, the ring gear R and the pinions P are rotated, wherein the rotational speed "Ns" of the sun-gear shaft 40, the rotational speed "Nc" of the carrier C and the rotational speed "Nin" of the input shaft 34a are inputted to the planetary gear device 32. The second mechanical loss "Wloss2" corresponds to a mechanical loss generated in the one-way clutch 42, which is caused by the difference for the rotational speed between the outer race and the inner race of the one-way clutch 42.

In the present embodiment, the target rotational speed "Ntgt" of the sun-gear shaft 40 is decided and set by use of a map, in which the total mechanical loss "Wtotal" is defined and correlated to the rotational speed "Ns" of the sun-gear shaft 40, the rotational speed "Nc" of the carrier C and the rotational speed "Nin" of the input shaft 34a.

The reason why the total mechanical loss "Wtotal" has a minimum value will be explained below.

The second mechanical loss "Wloss2" generated in the one-way clutch 42 becomes larger, as an absolute figure of the difference between the rotational speed "Nin" of the input shaft 34a and the rotational speed "Ns" of the sun-gear shaft 40 becomes larger. The first mechanical loss "Wloss1" generated in the planetary gear device 32 becomes larger, as an absolute figure of the difference between the rotational speed "Ns" of the sun-gear shaft 40 and the rotational speed "Nc" of the carrier C becomes larger. In other words, as an inclination of a straight line in a collinear graph of FIG. 5 becomes larger, the first mechanical loss "Wloss1" becomes larger. When the first mechanical loss "Wloss1" and the second mechanical loss "Wloss2" are added to each other, the total mechanical loss "Wtotal" has the minimum value, wherein the rotational speed "Ns" of the sun-gear shaft 40, the rotational speed "Nc" of the carrier C and the rotational speed "Nin" of the input shaft 34a are defined as variable numbers.

Figure 5:
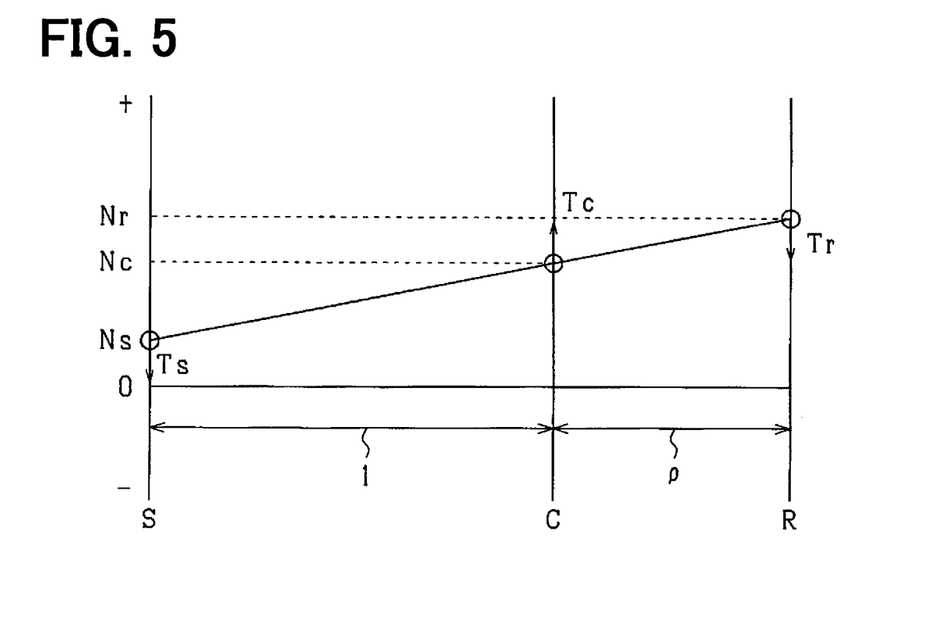
FIG. 5 is a view showing an operation of the planetary gear device.

In FIG. 5, the torque of the sun gear S is designated by "Ts", the torque of the carrier C is designated by "Tc" and the torque of the ring gear R is designated by "Tr". A ratio of a number of teeth "Zs" for the sung gear S with respect to a number of teeth "Zr" for the ring gear R is designated by "ρ" (Zs/Zr). In FIG. 5, each of arrows shows a direction of the respective torque. A direction of the arrow directing to an upward side in FIG. 5 shows a positive. Accordingly, a symbol of the rotational force inputted to the planetary gear device 32 is defined as the positive.

Figure 6:
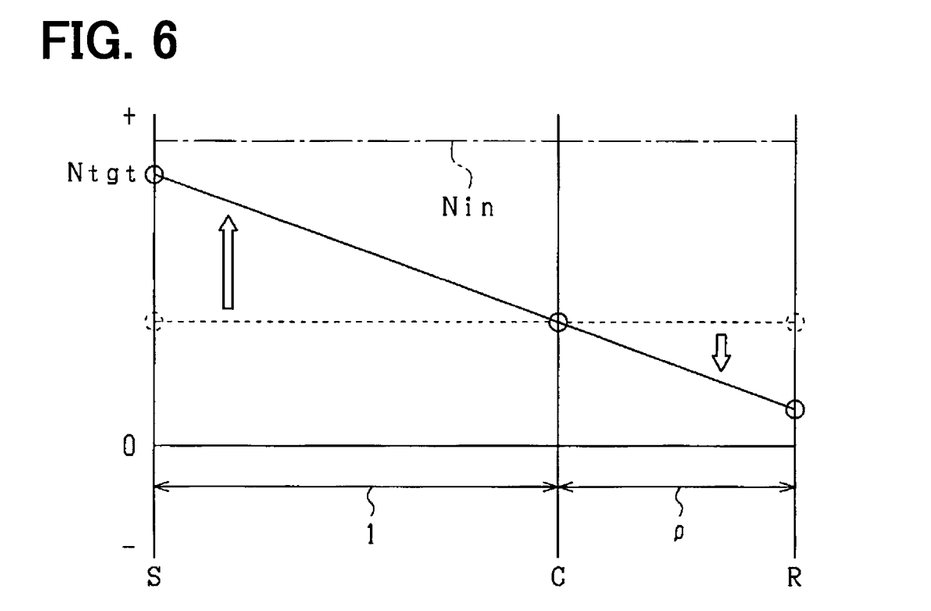
FIG. 6 is a view showing an example of the process for adjusting the speed difference.

Now back to FIG. 4, at a step S26, the controller 74 controls the torque adjusting device 36 to adjust the braking torque "Tt" of the torque adjusting device, so that the rotational speed "Ns" of the sun-gear shaft 40 is controlled at the target rotational speed "Ntgt" of the sun-gear shaft 40. According to the above control, the difference for the rotational speed between the sun-gear shaft 40 and the input shaft 34a becomes smaller. FIG. 6 shows that the rotational speed "Ns" of the sun-gear shaft 40 is increased by increasing the braking torque "Tt" of the torque adjusting device 32. As shown in FIG. 6, the rotational speed "Ns" of the sun-gear shaft 40 is controlled at the target rotational speed "Ntgt" of the sun-gear shaft 40.

When the determination at the step S10 is YES, when the determination at the step S12 is NO, or when the step S22 or the step S26 is ended, the process of FIG. 4 goes to END.

The above explained embodiment has the following advantages:

(A1) The sun-gear shaft 40 and the input shaft 34a are coupled to each other via the one-way clutch 42. It is, therefore, possible to avoid the situation that the rotational energy once accumulated in the flywheel 50 is discharged via the planetary gear device 32.

(A2) The rotational speed of the sun-gear shaft 40, at which the total mechanical loss "Wtotal" (the total of the first mechanical loss "Wloss1" generated in the planetary gear device 32 and the second mechanical loss "Wloss2" generated in the one-way clutch 42) is minimized, is set as the target rotational speed "Ntgt" of the sun-gear shaft 40. And the speed-difference adjusting control is carried out so that the rotational speed "Ns" of the sun-gear shaft 40 is controlled at the target rotational speed "Ntgt" of the sun-gear shaft 40. As a result, the mechanical loss which may be generated in the one-way clutch 42 can be made smaller and the efficiency for collecting the kinetic energy of the vehicle can be increased.

(A3) When the controller 74 determines that the estimated rotational speed "Nest" of the input shaft 34a is smaller than the rotational speed "Ns" of the sun-gear shaft 40, the braking torque "Tt" of the torque adjusting device 36 is controlled at the value of zero "0". It is, therefore, possible to block out the torque transmission between the flywheel 50 and the sun gear S in advance before the relative rotational speed of the sun-gear shaft 40 with respect to the rotational speed of the input shaft 34a is actually changed from the negative to the positive. It is thereby possible to avoid the decrease of the rotational energy of the flywheel 50, which may be caused as a result that the rotational energy is transmitted from the flywheel 50 to the planetary gear device 32.

(A4) The wet-type clutch mechanism 35 is provided in the torque adjusting device 36. It is possible to avoid the situation that the structure of the housing member 52a becomes complicated.

(A5) The multiple bearings are fixed to the single supporting member 60 of the cylindrical hollow shape for supporting the sun-gear shaft 40, the ring-gear shaft 44 and the input shaft 34a. According to such structure, misalignment of the center axis line can be made smaller among the sun-gear shaft 40, the ring-gear shaft 44 and the input shaft 34a. In other words, the coaxiality for those shafts can be increased. It is, therefore, possible to avoid the decrease of the reliability of the planetary gear device 32.

In addition, the cylindrical bore 40a is formed in the supporting member 60. The input shaft 34a and the sun-gear shaft 40 are coupled to each other in the cylindrical bore 40a via the one-way clutch 42. As a result, the structure for connecting the shafts can be made smaller. The power transmitting apparatus having the planetary gear device 32 is thereby becomes smaller as a whole.

Second Embodiment

A second embodiment of the present disclosure will be explained with reference to the drawings.

Figure 7:
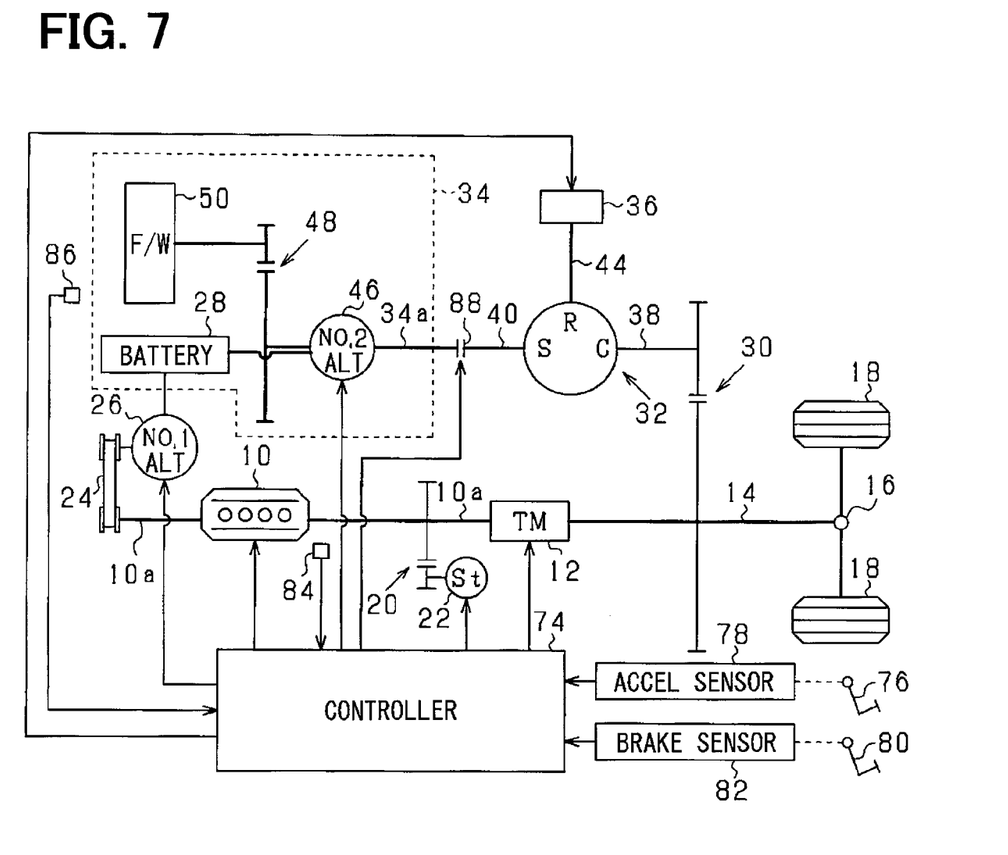
FIG. 7 is a diagram showing a system structure of a power transmitting apparatus according to a second embodiment of the present disclosure.

FIG. 7 shows a system structure of the second embodiment. The same reference numerals are used in FIG. 7 for such portions, which are the same or similar to those of the first embodiment.

A clutch 88 is provided between the input shaft 34a and the sun-gear shaft 40 in place of the one-way clutch 42 for blocking out the torque transmission between he input shaft 34a and the sun-gear shaft 40. The clutch 88 is an electronically controlled device for switching a torque-transmission allowing condition to a torque-transmission prohibiting condition, or vice versa. The operation of the clutch 88 is controlled by the controller 74.

In the regeneration control, the clutch 88 is switched to the torque-transmission allowing condition, in the condition that the braking operation is carried out by the vehicle driver.

Figure 8:
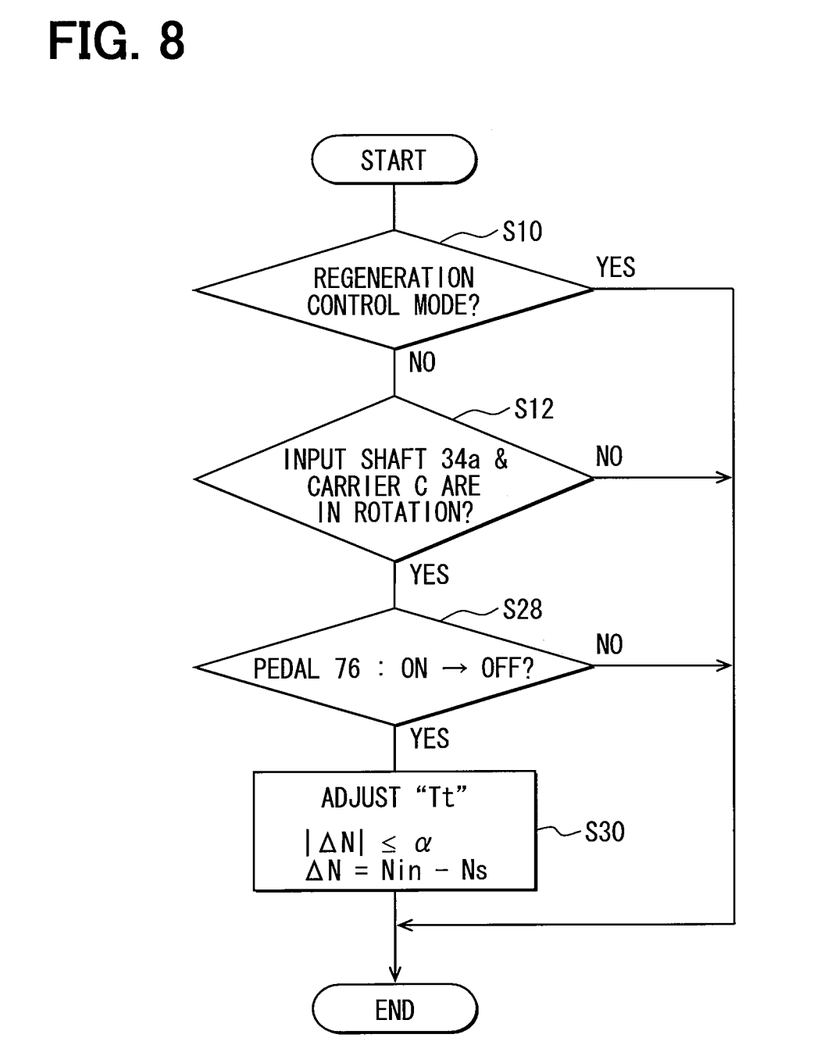
FIG. 8 is a flow-chart showing a process for adjusting a speed difference.

A speed-difference adjusting control of the second embodiment will be explained with reference to FIG. 8. A process of FIG. 8 is repeatedly carried out by the controller 74 at a predetermined cycle. The same reference numerals are likewise used in FIG. 8 for such steps, which are the same to those of FIG. 4.

When the determination at the step S12 is YES, the process goes to a step S28 in order to determine whether an operation of the acceleration pedal 76 is terminated or not. The step S28 corresponds to a process for estimating that the braking operation will be carried out or not. This determination is based on a common behavior of the vehicle driver that the brake pedal 80 is generally operated shortly after the acceleration pedal 76 is released from the stepping force.

When the determination at the step S28 is YES, the process goes to a step S30. At the step S30, the controller 74 operates the torque adjusting device 36 to adjust the braking torque "Tt" of the torque adjusting device 36, so that an absolute figure of a difference "ΔN" between the rotational speed "Nin" of the input shaft 34a and the rotational speed "Ns" of the sun-gear shaft 40 becomes equal to or lower than a predetermined value "α" (≥0).

Figure 9:
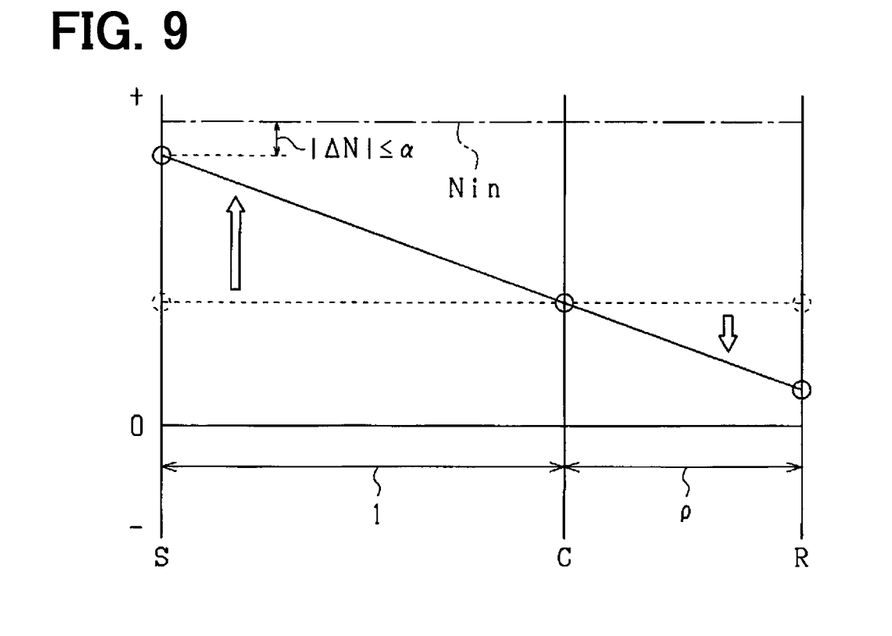
FIG. 9 is a view showing an operation of the planetary gear device.

FIG. 9 shows an operational condition of the rotational speed "Ns" of the sun-gear shaft 40 in a condition that the rotational speed "Ns" of the sun-gear shaft 40 is lower than the rotational speed "Nin" of the input shaft 34a. In FIG. 9, the braking torque "Tt" of the torque adjusting device 36 is increased. The rotational speed "Ns" of the sun-gear shaft 40 is increased in response to the increase of the braking torque "Tt" of the torque adjusting device 36, so that the absolute figure of the difference "ΔN" becomes equal to or lower than the predetermined value "α".

Figure 10:
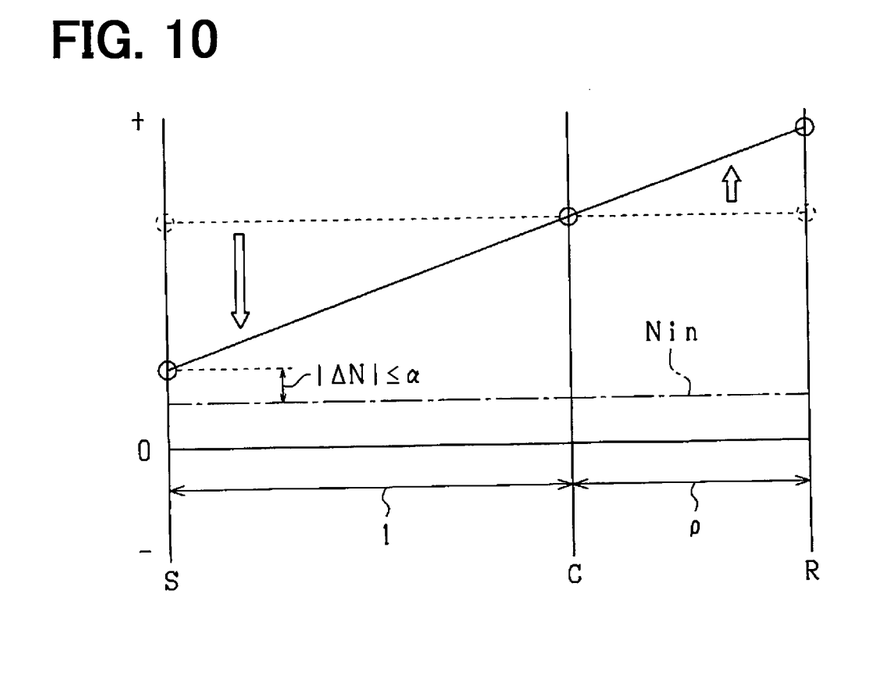
FIG. 10 is a view showing an example of the process for adjusting the speed difference.

FIG. 10 shows an operational condition of the rotational speed "Ns" of the sun-gear shaft 40 in a condition that the rotational speed "Ns" of the sun-gear shaft 40 is higher than the rotational speed "Nin" of the input shaft 34a. The rotational speed "Ns" of the sun-gear shaft 40 is decreased in response to the decrease of the braking torque "Tt" of the torque adjusting device 36, so that the absolute figure of the difference "ΔN" becomes equal to or lower than the predetermined value "α".

In the above process of FIG. 8, the mechanical loss "Wloss1" generated in the planetary gear device 32 is not taken into consideration. This is because, when the following first and second advantages are compared with each other, the second advantage is larger than the first advantage.

The first advantage corresponds to such an advantage, which can be obtained when the mechanical loss "Wloss1" is reduced by making smaller the difference for the rotational speed between the sun gear S and the carrier C.

The second advantage corresponds to such an advantage, which can be obtained when a mechanical loss generated in the clutch 88 is reduced by making smaller the absolute figure of the above difference "ΔN". The mechanical loss is generated in the clutch 88, when the clutch 88 is switched to the torque-transmission allowing condition for the regeneration control.

When the determination at the step S10 is YES, when the determination at the step S12 or at the step S28 is NO, or when the step S30 is ended, the process of FIG. 8 goes to END.

The above explained second embodiment has the following advantage (A6) instead of the advantages (A1) to (A3) of the first embodiment.

(A6) When the controller 74 determines that the stepping operation of the acceleration pedal 76 is stopped, the speed-difference adjusting control is carried out to adjust the braking torque "Tt" of the torque adjusting device 36, so that the absolute figure of the difference "ΔN" for the rotational speed between the input shaft 34a and the sun-gear shaft 40 is made to be equal to or smaller than the predetermined value "α". It is, therefore, possible to properly keep the time during which the difference "ΔN" for the rotational speed is made smaller in advance before the regeneration control is started. As above, the difference "ΔN" for the rotational speed is made smaller at the timing of starting the regeneration control. Namely, the time period from the timing of starting the regeneration control to a timing at which accumulation of the kinetic energy of the vehicle in the flywheel 50 is actually started can be made shorter. In addition, since the difference "ΔN" for the rotational speed is made smaller at the timing, at which the clutch 88 is switched to the torque-transmission allowing condition for the regeneration control, it is possible to reduce the mechanical loss generated when the clutch 88 is switched to the torque-transmission allowing condition. It is further possible to absorb impact due to the switching operation of the clutch 88 to the torque-transmission allowing condition.

(Modifications)

The present disclosure can be modified in various manners as below:

(M1) In the second embodiment, since the one-way clutch 42 is not provided, the sun-gear shaft 40 and the input shaft 34a may be formed as one unit shaft. In such a case, it is also possible to support the one-unit shaft and the ring-gear shaft 44 by the supporting member 60. The coaxiality for those shafts can be increased.

(M2) In the first embodiment, a rotational-speed maintaining control may be additionally carried out, so that the rotational speed of the flywheel 50 (which is detected by the rotational speed sensor 86) is maintained at a value higher than a predetermined value, as much as possible. The rotational-speed maintaining control corresponds to such a control for changing a distributing ratio of the kinetic energy of the vehicle between the flywheel 50 and the torque adjusting device 36, so as to increase the distributing ratio to the flywheel 50. The rotational-speed maintaining control will be further explained with reference to FIG. 5.

The sun gear S, the carrier C and the ring gear R are correlated as defined in the following formulas (eq1) and (eq2), when the torque is transmitted via the planetary gear device 32;

$$Tr=-Tc/(1+\rho) \quad (eq1)$$

$$Ts=-\rho Tc/(1+\rho) \quad (eq2)$$

According to the above correlation, when the regeneration control is carried out, the input torque "Tc" to the carrier C is decided depending on the running condition of the vehicle. Then, the output torque "Tr" of the ring gear R and the output torque "Ts" of the sun gear S are decided.

The rotational speed "Nc" of the carrier C, the rotational speed "Ns" of the sung gear S and the rotational speed "Nr" of the ring gear R are required to satisfy the correlation defined by the following formula (eq3):

$$Nr=(1+\rho)\times Nc-\rho\times Ns \quad (eq3)$$

The kinetic energy of the vehicle supplied from the driving wheels 18 to the flywheel 50 via the planetary gear device 32 and the input shaft 34a is proportional to the product of the rotational speed of the flywheel 50 and the input torque to the flywheel 50 (that is, the torque obtained by dividing the output torque of the sun gear S by the speed-increase ratio of the speed-increase gear mechanism 48).

Based on the above proportional relationship and based on the fact that the input torques to the sun gear S, the carrier C and the ring gear R are decided depending on the running condition of the vehicle, the kinetic energy of the vehicle distributed to the flywheel 50 becomes larger than that to the torque adjusting device 36, as the rotational speed of the flywheel 50 is higher. Accordingly, when the rotational speed of the flywheel 50 is maintained at the value higher than the predetermined value as much as possible, it is possible to increase the amount of the kinetic energy of the vehicle which can be collected in the flywheel 50 during the regeneration control.

The rotational-speed maintaining control can be carried out in the following manner. When the controller 74 determines that the engine 10 is operated in a low load range (for example, the controller 74 determines that the required driving force for the engine 10 is lower than a predetermined value), the required driving force for the engine 10 is increased and the braking torque of the torque adjusting device 36 is applied to the ring gear R. Then, such increased driving force of the engine 10 is transmitted to the flywheel 50 via the planetary gear device 32 and the input shaft 34a. The rotational-speed maintaining control is carried out when the engine 10 is operated in the low load range, because of the following reason.

Heat efficiency of the engine 10 is generally decreased in the operating range in which the required driving force for the engine 10 is low. Therefore, energy on combustion of fuel, which is necessary for the engine 10 in order to produce the same indicated output, is increased. In view of the above point, the required driving force for the engine 10 is increased when the engine 10 is operated in the low load range. Then, the increased driving force of the engine 10 is transmitted to the flywheel 50. As above, the amount of fuel, which corresponds to the mechanical loss, cooling loss of the engine 10 or the like, can be used for the accumulation of the rotational energy in the flywheel 50.

(M3) In the first embodiment, the map is used at the step S24 (FIG. 4) for setting the target rotational speed "Ntgt" of the sun-gear shaft 40. In the map, the total mechanical loss "Wtotal" is defined and correlated to the rotational speed "Ns" of the sun-gear shaft 40, the rotational speed "Nc" of the carrier C and the rotational shaft "Nin" of the input shaft 34a.

The rotational speed "Ni" of the input shaft 34a can be controlled by the rotational-speed maintaining control and/or a power generation control of the second alternator 46, so that the rotational speed "Ni" of the input shaft 34a fluctuates within a small range. When the fluctuation of the rotational speed "Ni" of the input shaft 34a is controlled within such a small range, the rotational speed "Ni" of the input shaft 34a can be treated as a fixed figure when making the map for the step S24. Then, the total mechanical loss "Wtotal" to be used at the step S24 may be defined and correlated to only the rotational speed "Ns" of the sun-gear shaft 40 and the rotational speed "Nc" of the carrier C. According to such a map, a number of input variables for the map becomes two.

(M4) An alternator may be used as the torque adjusting device instead of the wet-type electromagnetic braking unit. In such a case, an electric-power generating amount is increased so that the torque inputted to the alternator is increased, to thereby increase the braking torque "Tt" to be applied to the ring gear R.

(M5) The speed-difference adjusting control is not limited to that explained in the first embodiment. For example, the speed-difference adjusting control may be alternatively carried out in the following manner.

The braking torque "Tt" of the torque adjusting device 36 is so controlled that the difference of the rotational speed between the sun-gear shaft 40 and the input shaft 34a is lower than the predetermined value.

(M6) In the first embodiment (at the step S18 of FIG. 4), the controller 74 estimates the rotational speed of the input shaft 34a at the next processing cycle. The controller 74 may estimate the rotational speed of the input shaft 34a at a further processing cycle, for example, at a processing cycle of N-times ahead (N is an integral number equal to or larger than 2).

(M7) As explained above, in the first embodiment (at the step S18 of FIG. 4), the controller 74 estimates the rotational speed of the input shaft 34a at the next processing cycle. It is not always necessary to estimate the future rotational speed of the input shaft 34a. For example, at the step S20, the controller may calculate a value by dividing the rotational speed "Nfw" of the flywheel 50 (detected by the rotational speed sensor 86) by the speed-increase ratio "Ratio" of the speed-increase gear mechanism 48. Then, the controller may determine whether the above calculated value is larger than the rotational speed "Ns" of the sun-gear shaft 40.

(M8) In the first embodiment (at the step S24 of FIG. 4), the rotational speed "Ns" of the sun-gear shaft 40, at which the total mechanical loss "Wtotal" (the mechanical loss "Wloss1" generated at the planetary gear device 32+the mechanical loss "Wloss2" generated in the one-way clutch 42) is minimized is set as the target rotational speed "Ntgt" of the sun-gear shaft 40.

However, any other value for the rotational speed "Ns" of the sun-gear shaft 40, by which the total mechanical loss "Wtotal" comes to a value closer to the minimum value, may be set as the target rotational speed "Ntgt" of the sun-gear shaft 40, so long as the difference between the rotational speed "Nin" of the input shaft 34a and the rotational speed "Ns" of the sun-gear shaft 40 becomes smaller.

(M9) In the above first embodiment, the torque adjusting device 36 may be connected to the sun gear S of the planetary gear device 32, while the input shaft 34a may be connected to the ring gear R via the one-way clutch 42.

(M10) The energy accumulating device is not limited to the combination of the rotational energy accumulating device (the flywheel 50) and the electric energy accumulating device (the second alternator 46 and the battery 28). The energy accumulating device may be any one of them.

For example, the second embodiment may be modified, in which only the electric energy accumulating device is provided. In such a case, when the regeneration control is not carried out and thereby the electric-power generation is not carried out, the clutch 88 is switched to the torque-transmission prohibiting condition so as to decrease the mechanical loss which may be caused by idle running of the alternator.

In addition, the energy accumulating device may be composed of a heat energy accumulating device, according to which the inputted rotational energy is converted into the heat energy. For example, the heat energy accumulating device may be composed of a blade (or multiple blades) connected to the input shaft 34a and a casing for holding working fluid agitated by the blade. In such a case, the heat accumulated in the heat accumulating device can be used for a heating operation of a passenger compartment of the vehicle. The clutch 88 is switched to the torque-transmission prohibiting condition, when the regeneration control is not carried out. Since the input shaft 34a and the sun-gear shaft 40 are separated from each other, it is possible to avoid a situation that the rotational force generated at the engine 10 is used for driving the blade. Namely, waste of the energy can be avoided.

(M11) In the first embodiment (at the step S10 of FIG. 4), the controller determines whether the vehicle running condition is in the regeneration control mode or not based on the output signal of the brake sensor 82. When the fuel-cut operation is carried out, the controller may determine that the vehicle running condition is in the regeneration control mode.

(M12) Various kinds of one-way clutch or any other device having the same or similar function may be used instead of the one-way clutch 42.

(M13) The present disclosure can be applied to the vehicle having the engine and the electric rotating machine. The present disclosure may be further applied to a vehicle having only the electric rotating machine.

What is claimed is:

1. A power transmitting apparatus for a vehicle, which has a driving-power source for generating a driving power for the vehicle, comprising;
   a planetary gear device having a first rotating member, a second rotating member and a third rotating member,
   the first rotating member being operatively connected to an energy accumulating device via an input shaft,
   the second rotating member being connected to a driving wheel of the vehicle via a driving shaft to which the driving-power source is operatively connected,
   the third rotating member being connected to a torque adjusting device;
   wherein the torque adjusting device generates a braking torque for applying the braking torque to the third rotating member,
   wherein the first rotating member, the second rotating member and the third rotating member are rotatably coupled to one another so that a rotational force is operatively transmitted to the energy accumulating device via the planetary gear device;
   a block-off device provided between the first rotating member and the input shaft for blocking off a power transmission from the input shaft to the first rotating member; and
   a control unit configured to control an operation of the power transmitting apparatus,
   wherein the control unit carries out a regeneration control when there is no demand for generating the driving power at the driving-power source, so that a kinetic energy of the vehicle is transmitted to the energy accumulating device via the planetary gear device and the input shaft and the kinetic energy is accumulated in the energy accumulating device, and
   wherein the control unit further carries out a speed-difference adjusting control when the regeneration control is not carried out, so that the braking torque to be generated at the torque adjusting device is adjusted so that a difference between a rotational speed of the first rotating member and the input shaft is reduced.

2. The power transmitting apparatus according to claim 1, wherein
   the block-off device comprises a one-way clutch, which operatively connects the input shaft and the first rotating member with each other in order to transmit the rotational force from the first rotating member to the input shaft only when a relative rotational speed of the first rotating member with respect to the input shaft is equal to zero or larger than zero, and
   the speed-difference adjusting control is carried out when the relative rotational speed is negative in order to adjust the braking torque of the torque adjusting device.

3. The power transmitting apparatus according to claim 2, wherein
   the control unit sets a target rotational speed for a rotational speed of the first rotating member based on a total mechanical loss,
   wherein the total mechanical loss is a total value of a first mechanical loss to be generated in the planetary gear device and a second mechanical loss to be generated in the block-out device due to a rotational speed difference between an input side and an output side thereof, and the speed-difference adjusting control is carried out to adjust the braking torque of the torque adjusting device, so as to control the rotational speed of the first rotating member at the target rotational speed.

4. The power transmitting apparatus according to claim 2, wherein the control unit estimates a future rotational speed of the input shaft, and the control unit controls the braking torque of the torque adjusting device at a value of zero, when the regeneration is not carried out, and when the control unit determines that the future rotational speed of the input shaft will be equal to or larger than the rotational speed of the first rotating member.

5. The power transmitting apparatus according to claim 1, wherein the block-out device is an electrically controlled clutch provided between the first rotating member and the input shaft for switching a torque-transmission allowing condition to a torque-transmission prohibiting condition and vice versa, the control unit estimates that a braking operation will be carried out for the vehicle or determines that the braking operation is carried out, and the control unit controls the braking torque of the torque adjusting device, when control unit estimates that the braking operation will be carried out for the vehicle, or when control unit determines that the braking operation is carried out for the vehicle.

6. The power transmitting apparatus according to claim 5, wherein the vehicle has an acceleration control device to be operated by a vehicle driver in order to transmit an instruction to the driving-power source for generating the driving power for the vehicle, and the control unit estimates that the braking operation will be carried out for the vehicle, when acceleration control device is not operated.

7. The power transmitting apparatus according to claim 1, wherein the energy accumulating device is a flywheel for accumulating the rotational force inputted via the input shaft as rotational energy.

8. The power transmitting apparatus according to claim 1, wherein the energy accumulating device comprises;

an electric power generator, which is provided between a flywheel of the energy accumulating device and the input shaft, for converting the rotational force inputted via the input shaft into electric energy; and a battery for accumulating the electric energy generated by the electric power generator.

9. The power transmitting apparatus according to claim 1, wherein the torque adjusting device is an electrically controlled braking device having a wet-type clutch unit.

10. The power transmitting apparatus according to claim 1, wherein the first rotating member is a sun gear, the second rotating member is a carrier, the third rotating member is a ring gear, and wherein the planetary gear device comprises;

a supporting member of a cylindrical shape having a through-hole coaxially extending with a center axis line of the supporting member;

a first inside bearing fixed to a first inner peripheral portion of the supporting member for rotatably supporting a sun-gear shaft, which is coaxially connected to the sun gear; and an outside bearing fixed to an outer peripheral portion of the supporting member for rotatably supporting a ring-gear shaft, which is coaxially connected to the ring gear.

11. The power transmitting apparatus according to claim 10, wherein the block-off device comprises a one-way clutch, which operatively connects the input shaft and the sun-gear shaft with each other in order to transmit the rotational force from the sun-gear shaft to the input shaft only when a relative rotational speed of the sun-gear shaft with respect to the input shaft is equal to zero or larger than zero, a second inner peripheral portion is coaxially formed in the supporting member with the first inner peripheral portion, and a second inside bearing is fixed to the second inner peripheral portion of the supporting member for rotatably supporting the input shaft.

12. A power transmitting apparatus for a vehicle, which has an engine and an energy accumulating device, comprising;

a planetary gear device provided between the energy accumulating device and a driving wheel of the vehicle, the planetary gear device having;

a sun gear operatively connected to an input shaft of the energy accumulating device, a carrier operatively connected to the driving wheel, and a ring gear, wherein the sun gear, the carrier and the ring gear are operatively engaged one another for operatively transmitting a rotational force of the driving wheel to the energy accumulating device in a regeneration control;

a torque adjusting device for generating a braking torque and operatively connected to the ring gear, in order to apply the braking force to the ring gear;

a one-way clutch operatively provided between the input shaft of the energy accumulating device and the sun gear of the planetary gear device for transmitting the rotational force of the driving wheel from the sun gear to the input shaft only when a rotational speed of the sun gear is higher than a rotational speed of the input shaft;

an electric power generating device provided between the input shaft and a flywheel of the energy accumulating device so that the electric power generating device is continuously connected to the flywheel; and a control unit configured to control the torque adjusting device, when the regeneration control is not carried out, so that the braking torque to be generated at the torque adjusting device is adjusted in order to control a difference of a rotational speed between the sun gear and the input shaft at a smaller value than when the regeneration control is carried out.

13. A power transmitting apparatus for a vehicle, which has an engine and an energy accumulating device, comprising;

a planetary gear device provided between the energy accumulating device and a driving wheel of the vehicle, the planetary gear device having;

a sun gear operatively connected to an input shaft of the energy accumulating device, a carrier operatively connected to the driving wheel, and a ring gear, wherein the sun gear, the carrier and the ring gear are operatively engaged one another for operatively transmitting a rotational force of the driving wheel to the energy accumulating device in a regeneration control;

a torque adjusting device for generating a braking torque and operatively connected to the ring gear, in order to apply the braking force to the ring gear;

a clutch provided between the input shaft of the energy accumulating device and the sun gear of the planetary gear device, the clutch being switched to a power-transmission allowing condition so that the rotational force of the driving wheel is transmitted from the sun gear to the input shaft in the regeneration control, the clutch being switched to a power-transmission prohibiting condition when the regeneration control is not carried out;

an electric power generating device provided between the input shaft and a flywheel of the energy accumulating device so that the electric power generating device is continuously connected to the flywheel; and a control unit configured to control the torque adjusting device, when the regeneration control is not carried out, so that the braking torque to be generated at the torque adjusting device is adjusted in order to control a difference of a rotational speed between the sun gear and the input shaft at a smaller value than when the regeneration control is carried out.

* * * * *